United States Patent
Hsin et al.

[11] Patent Number: 6,152,477
[45] Date of Patent: Nov. 28, 2000

[54] LOCKING DEVICE FOR A FOLDABLE STROLLER

[75] Inventors: Ya-Wen Hsin, Kaohsiung; Cheng-Fan Yang, Tainan Hsien, both of Taiwan

[73] Assignee: Link Treasure Limited, Virgin Islands (Br.)

[21] Appl. No.: 09/556,895

[22] Filed: Apr. 20, 2000

[51] Int. Cl.⁷ .................................................... B62B 7/08
[52] U.S. Cl. ........................ 280/642; 280/647; 280/658
[58] Field of Search ................................ 280/637, 38, 42, 280/641, 642, 647, 649, 657, 658, 47.38

[56] References Cited

U.S. PATENT DOCUMENTS

| | | | |
|---|---|---|---|
| 5,110,150 | 5/1992 | Chen | 280/642 |
| 5,605,409 | 2/1997 | Haut et al. | 280/642 |
| 5,645,293 | 7/1997 | Cheng | 280/642 |
| 5,725,338 | 3/1998 | Huang | 280/642 |
| 5,934,153 | 8/1999 | Yang | 280/642 |

FOREIGN PATENT DOCUMENTS

| | | | |
|---|---|---|---|
| 2179897 | 3/1987 | United Kingdom | 280/642 |

*Primary Examiner*—Richard M. Camby
*Attorney, Agent, or Firm*—W. Wayne Liauh

[57] ABSTRACT

The present invention relates to a locking device for a foldable stroller, which is applied in a foldable stroller which is constructed of a plurality of frames capable of folding and unfolding, especially in control means which is two-stage in the operation process of folding and unfolding. The present invention utilizes a sliding element to control two frames of a stroller in both folded and unfolded positions. In its first position, the frames is stationary and fixed. Once the sliding element is pulled at first stage, one frame escapes therefrom and stops until reaching a stop tip. In the second stage, the frames is still stopped by ring-pull thereof after the sliding element is pulled again, and the frames are finally unfolded until the sliding element is continuing pulling again.

8 Claims, 5 Drawing Sheets

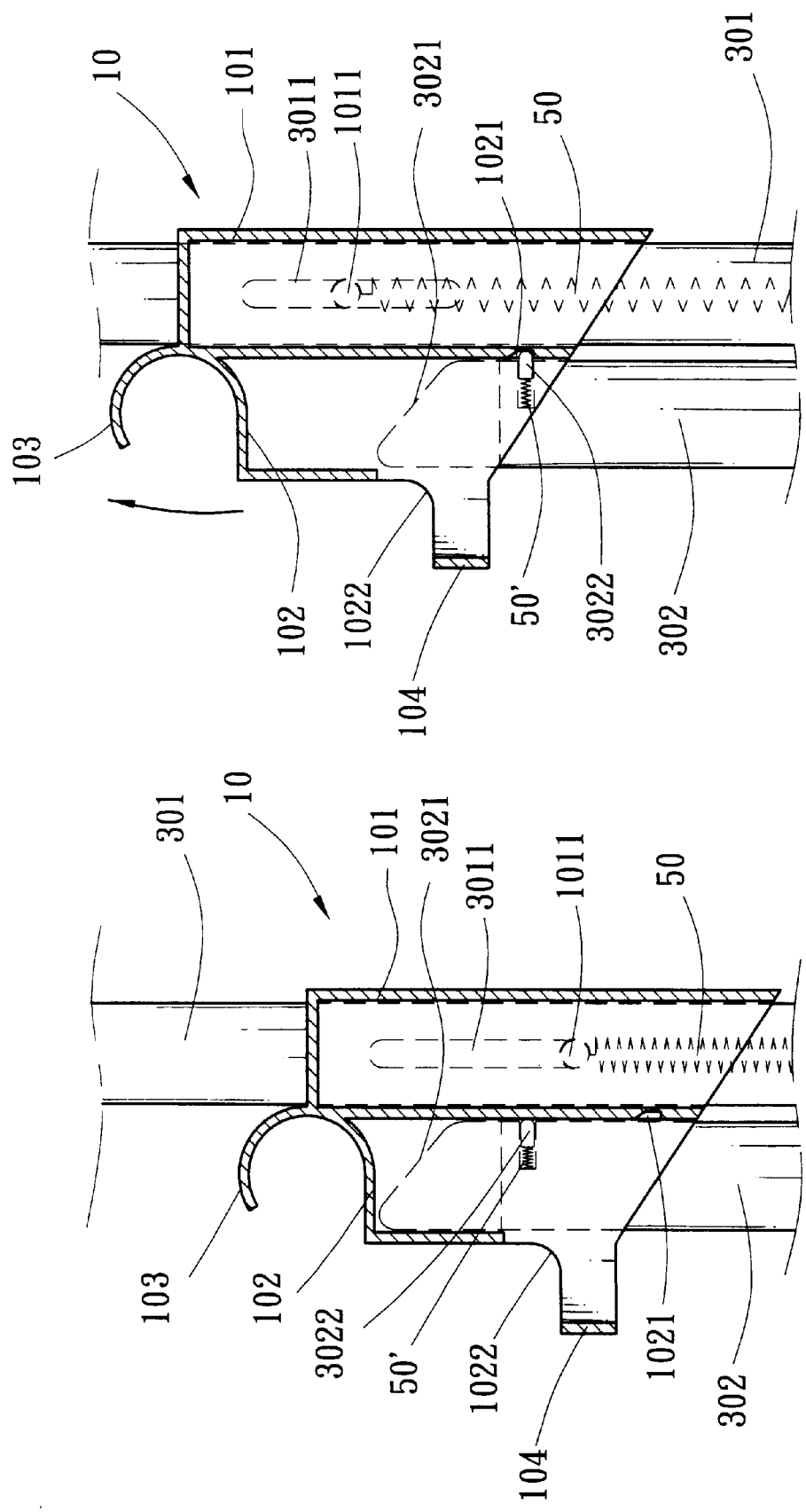

LOCKING DEVICE FOR A FOLDABLE STROLLER

BACKGROUND OF INVENTION

1. Field of the Invention

The present invention relates generally to a locking device for a foldable stroller. More particularly, the present invention relates to a two-stage locking device which is applied in the stroller capable of both folding and unfolding.

2. Description of Related Art

The conventional stroller, baby bed and baby dinner chair etc. are generally constructed of a plurality of tubular elements. Take a stroller for example, which is constructed of a plurality of tubular elements mutually connected to form a main frame in which a seating area of an infant is provided by mounting a clothing pad thereon, and wheels are connected thereon to benefit moving freely. All these baby products have the same design, the tubular elements can be folded and movably shrink together to a smaller size in volume when not in use. That is, the tubular elements are mutually movable toward each other. Of course, these tubular elements can also be fixed while in use by putting a locking mechanism between two tubular elements and released to fold up. Take the U.S. Pat. No. 5,876,057 for example, it disclosed a stroller which is composed of upper support and a set of lower supports pivotally connected with the upper support and having a pair of symmetrically opposed front supports, a pair of symmetrically opposed rear supports each pivotally connected with each of the pair of the front supports and a seat pivotally and respectively connected with the upper support, the front supports and the rear supports. A slot is defined in a periphery of the upper support for movably receiving a post. The post is constrained within the slot and connected with a spring. The upper support and the front support are securely connected together until the protrusion is pulled to disengage from the post. After the protrusion is pulled, the stroller is about to be folded. However, it has a tendency to misactivate the stroller to fold up that using only one step to disengage the protrusion from securely connected status. The unwanted operation may even be made by a baby or an unexpected touch. Danger happens under this condition.

To avoid this kind of dangerous operation, an additional safe lock is important except the aforesaid engaging mechanism. Referring to FIGS. 1A and 1B, it illustrate embodiment of the present in different operation position. The stroller of the present invention comprises a front frame 41, rear frame 42, wheel 43 and handle frame 44. The handle frame 44 is pivotally connected with front frame 41 and has a first safe lock 45 and a second safe lock 46 movably connected thereon. When the stroller is expanded, the first lock 45 and the second lock 46 both engage with the front frame 41. On case of folding the stroller, the first lock 45 is firstly disengaged from the front frame 41, and the second lock 46 is then turned to fully disengage them. This two-stage operation allows the handle frame 44 to move toward the front frame 41, and the stroller is folded. The stroller equipped with two-stage lock disclosed in the present invention will be safer and can securely protect a baby because there are two processes to disengage the frames being folded.

SUMMARY OF THE INVENTION

Accordingly, the present invention provides mainly a foldable stroller equipped with two-stage locking device provided for operating two constraining steps to disengage the frames thereof.

The other object of the present invention is to provide a single movable device which is capable of operating two steps of locking process.

In order to meet the object of the present invention, which at least comprising: a first frame, a second frame connected with the first frame by a joint member and a sliding element mounted onto the first frame and the second frame slide and provided for controlling the frames to fold or unfold. The sliding element normally prevents the frames from folding together and is pulled up to disengage one of the frames. The pulling up process of the sliding element at its first step will move in accordance with the pulling direction until reaching a stop tip of the frame and then stops. The frames of stroller are about to fold. At second step, the frames are still restricted to continue folding by safe buckle of the sliding element until the sliding element is pulled more once. These and other features of the present invention will become more fully apparent from the following description and dependent claims taken in conjunction with the accompanying drawings.

BRIEF DESCRIPTION OF THE DRAWINGS

The present invention is illustrated by the following drawings in which

FIG. 3A is an enlarged sectional view of frame of present invention, depicting the expanding status.

FIG. 3B is an enlarged sectional view of frame of present invention in the first position.

DETAILED DESCRIPTION OF THE PREFERRED EMBODIMENT

Figure 1A:
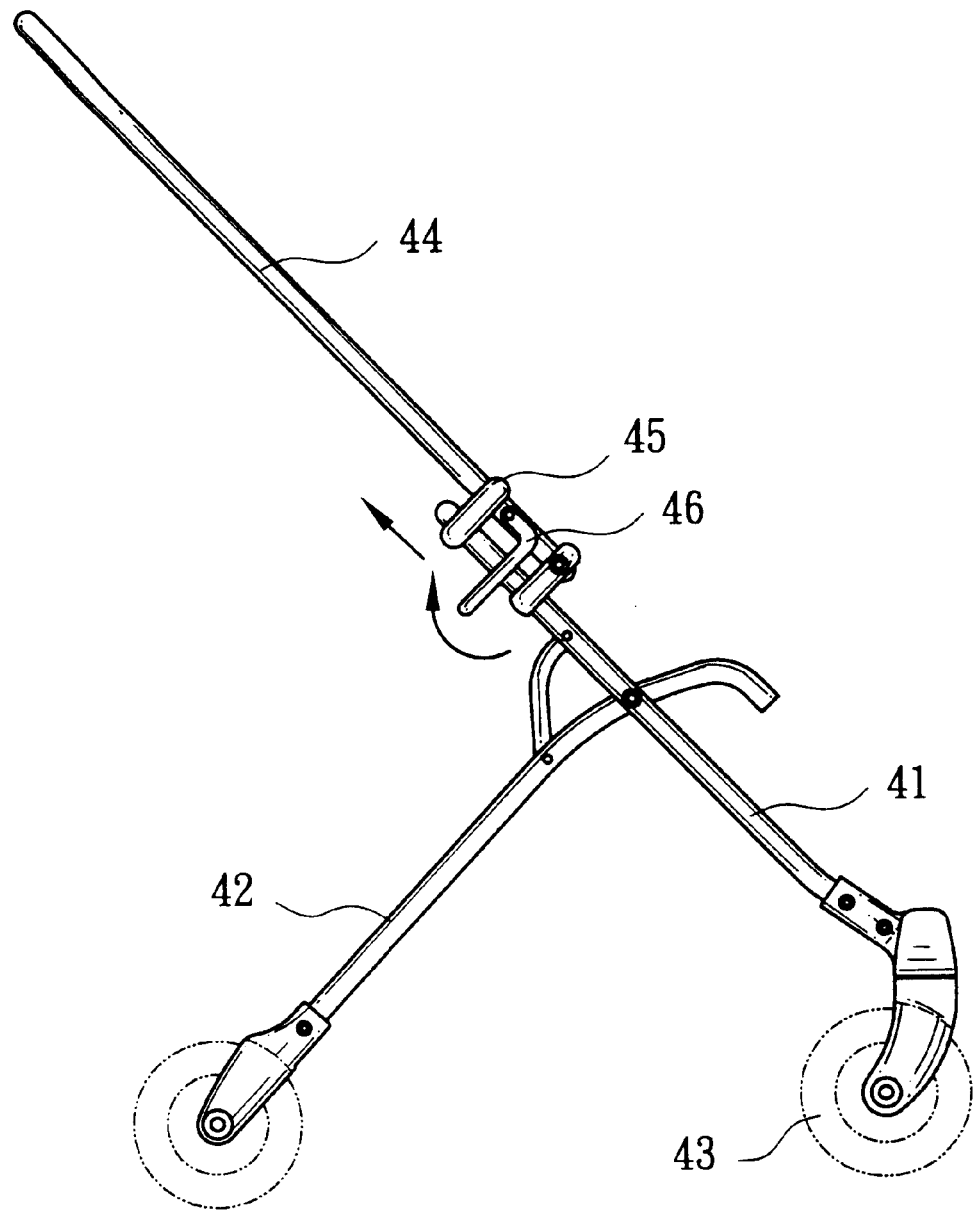
FIG. 1A is a schematic view of conventional stroller equipped with two-stage lock link bars, depicting the expanding status.
Figure 1B:
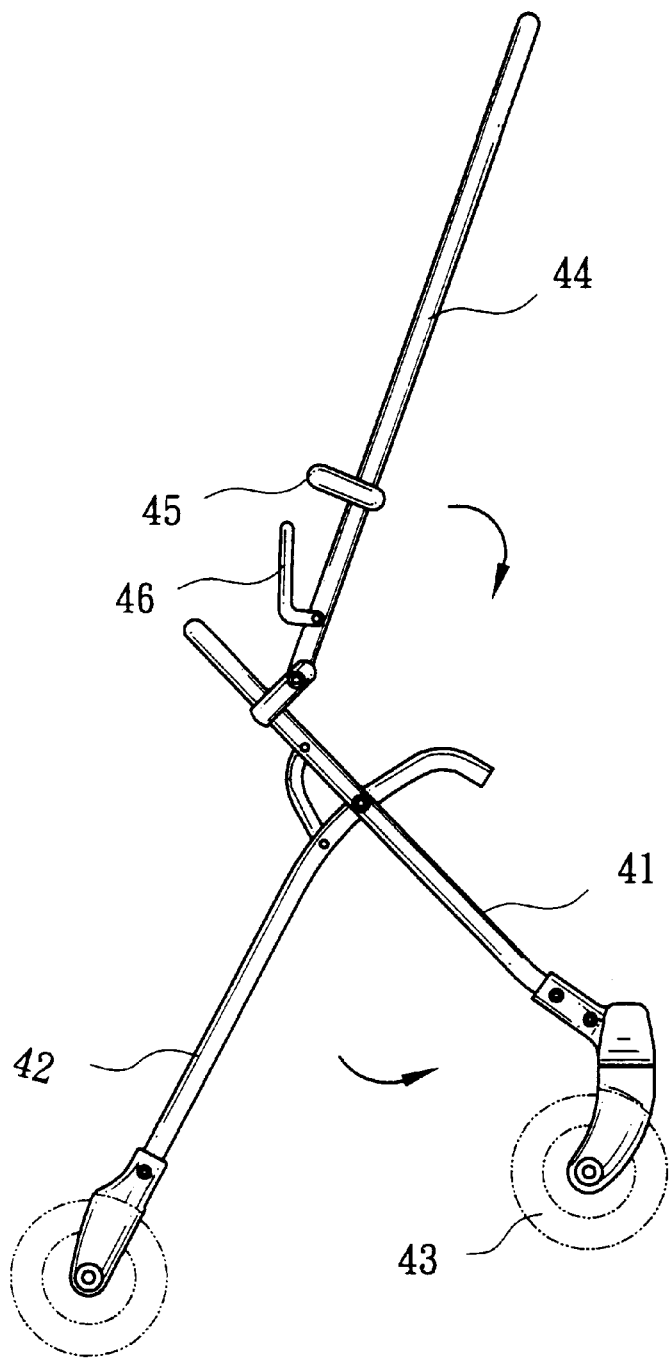
FIG. 1B is a schematic view of conventional stroller equipped with two-stage lock link bars, depicting the folding status.
Figure 2:
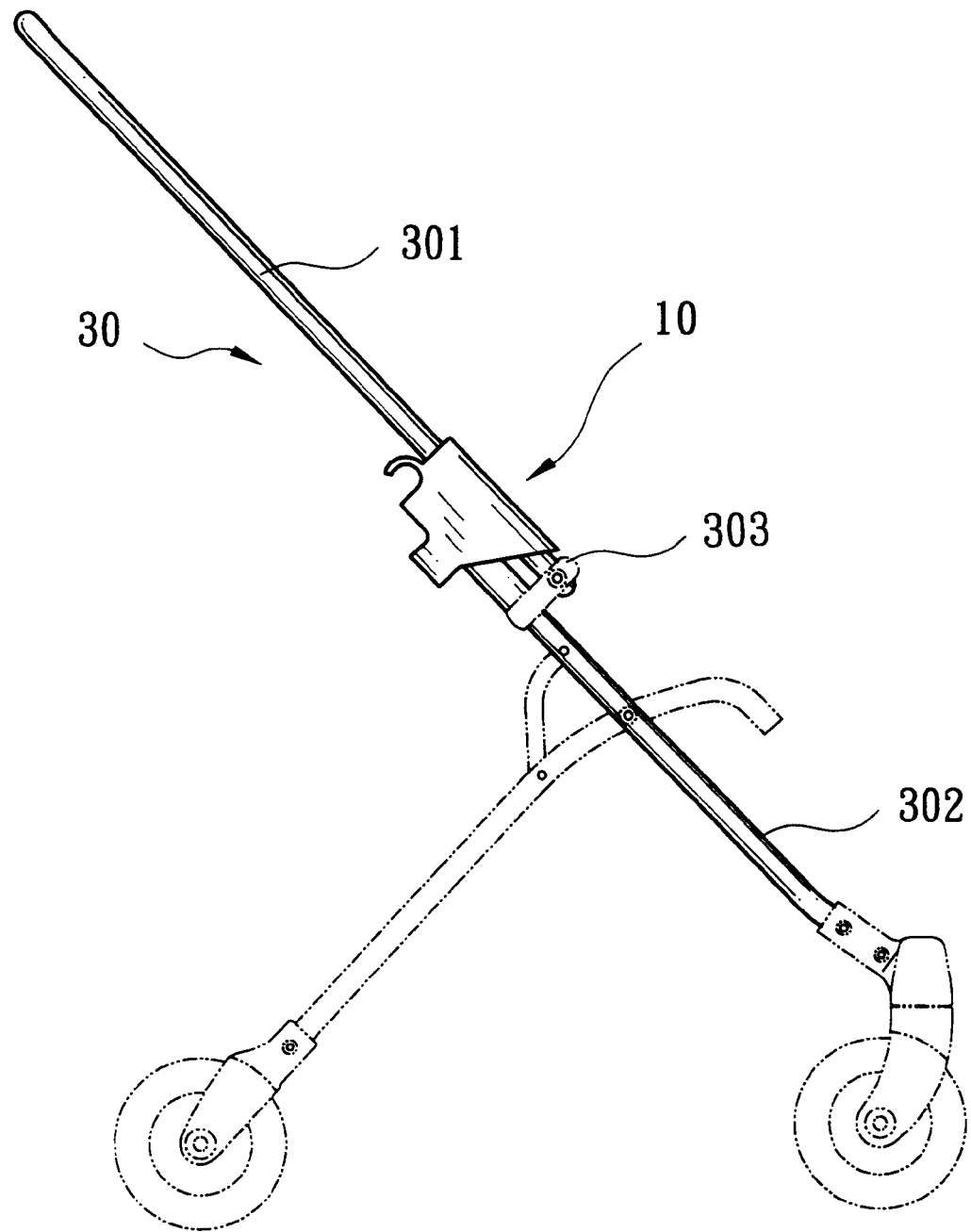
FIG. 2 is a schematic view of stroller of present invention.

Referring to FIG. 2, it shows a locking device for a stroller. The stroller 30 comprises a main frame which is constructed by a plurality of tubular frames and allows these frames to fold and unfold. The main frame of the stroller 30 includes a handle frame, named first frame 301 hereinafter, and a front frame, named second frame 302 hereinafter, which is connected with the first frame by a joint 303. The first frame 301 and the second frame 302 pivot on the joint 303 when operating folding and unfolding process. A sliding element 10 is also connected with both the first frame 301 and the second frame 302.

Referring to FIG. 3A, the sliding element 10 is generally a cover enclosing a first cannular tube 101, a second cannular tube 102 which is parallel to the first cannular tube 101 and a ring-pull 103. The first cannular tube 101 is hollow throughout therein. The first cannular tube 101 built inside the sliding element 10 is mounted on the first frame 301 and provided for making the sliding element 10 capable of sliding along the first frame 301. The second cannular tube is also hollow inside with upper distal end closed and lower distal end open and mounted on the second frame 302. A guiding slot 3011 is defined in periphery of first frame 301 and provided for receiving a bar 1011. The bar 1011 of the sliding element 10 goes through the guiding slot 3011. A distal end of spring 50 is connected to bar 1011 and the other distal end thereof is connected to a distal end of first frame 301. The sliding element 10 is normally hold at position that the second frame 302 is just covered inside in order to prevent the first frame 301 and the second frame 302 from folding together, that is, in an expanding position. The second frame 302 has a guiding ramp 3021 at upper portion thereof. A stop tip 3022 is constructed in periphery of the second frame 302, which further connects a spring 20 normally stretching out of the second frame 302 therefrom and being pushed in by applying force. A stop trough 1021 is defined in periphery of the second frame 102 provided for receiving the stop tip 3022. A recess 1022 is defined in the position that has the same distance with that of stop tip 3022 to stop trough 1021 when measured from the upper distal end of the second frame 102 and connects a safe buckle 104.

Next referring to FIG. 3B, when a user wants to fold the first frame 101 toward the second frame 102, he pulls up the ring-pull 103 which simultaneously carries the sliding element 10 to move in the same direction. The stop trough 1021 of the sliding element 10 gradually moves toward the stop tip 3022. The stop tip 3022 finally stretches into the stop trough 1021, and the sliding element 10 is stopped moving upward, which is named the first position of sliding element 10. At this moment, the upper distal end of the second frame 302 is about lower than the recess 1022, and the first frame 301 pivots on joint 303 and rotates toward the folding direction.

Figures 3C, 3D:
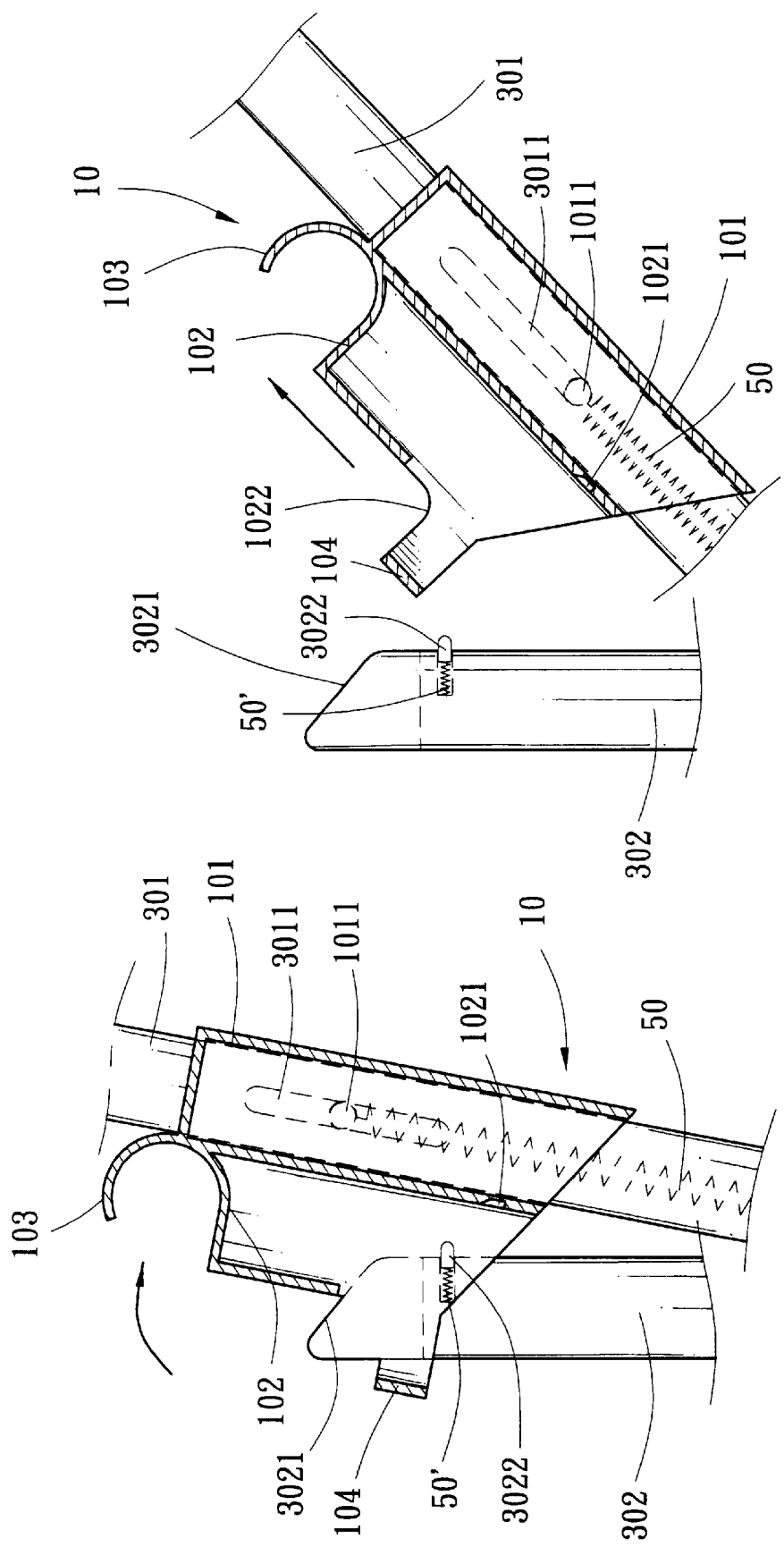
FIG. 3C is an enlarged sectional view of frame of present invention in the second position.
FIG. 3D is an enlarged sectional view of frame of present invention, depicting the folding status.

Referring FIG. 3C, after the second frame 302 leaves the recess 1022, it will be constrained by the safe buckle 104 and can not move further, which is named the second position of sliding element 10. The sliding element 10 is pulled again to let the second frame 302 leave safe buckle 104 and totally escape from sliding element 10 until moving to a fully unlocked position, as shown in FIG. 3C. Under this circumstance, the first frame 301 and the second frame 302 can finally fold together.

In the abovementioned description, when a user wants to fold the first frame 301 and the second frame 302 together, he must firstly pull the sliding element 10 until the stop tip 3022 of the second frame can stretch into the stop trough 1021 thereof, that is, the first position of the sliding element 10. In the first position, the second frame 302 is still constrained within the sliding element 10 to secure the first frame 301 and the second frame 302 in an unfolded status. More particularly, in the first position, the first frame 301 can move toward the second frame 302, but the safe buckle 104 of the sliding element 10 will stop and keep the second frame 302 in the second position, that is, to stop the moving of the first frame 301. The first frame 301 can not move toward the second frame 302 any longer except the sliding element 10 is pulled again. After the sliding element 10 is pulled again to its unlocking position, the first frame 301 can move toward the second frame 302 until folded together.

Numerous variations and modifications will suggest themselves to persons skilled in the arts, other than those already described, without departing the basic inventive concepts. Although the present invention has been described with respect to typical preferred embodiments thereof, it should be understood that the present inventions is not limited to these embodiments and various changes or modifications may be made without departing from the scope of the present invention as defined by the appended claims.

What is claimed is:

1. A locking device for a foldable stroller which is applied in a stroller constructed with a plurality of frames, comprising:

a first frame, a second frame connected with said first frame by a joint, which pivots on said joint and foldable with said first frame, a sliding element provided for controlling the operation of folding of both said first frame and said second frame, which comprises a first cannular tube covering said first frame, a second cannular tube parallel to said first cannular tube and covering said second frame and a safe buckle extending from said sliding element, wherein said sliding element can slide along said first frame to a first position at which said second cannular tube leave apart said second frame and then to a second position at which said second frame is constrained by said safe buckle to prevent from folding of said first frame and said second frame, and a stop tip defined in periphery of said second frame, which is extendable in axial direction thereof and extends out when said sliding element is in first position, provided for restricting the continuing sliding of said sliding element directly to unlocked position.

2. A locking device for a foldable stroller as described in claim 1, wherein said first frame has a guiding slot which is provided for receiving a bar defined in said sliding element and connected to said sliding element by a spring.

3. A locking device for a foldable stroller as described in claim 1, wherein said first cannular tube is hollow inside throughout thereof.

4. A locking device for a foldable stroller as described in claim 1, wherein said second cannular tube is hollow, closed at top end and open at bottom end thereof.

5. A locking device for a foldable stroller as described in claim 1, wherein said second cannular tube has a stop trough located at an adequate distance from said stop tip.

6. A locking device for a foldable stroller as described in claim 1, wherein said second cannular tube has a recess located at the same distance from said stop trough to said stop tip.

7. A locking device for a foldable stroller as described in claim 1, wherein said sliding element further has a ring-pull.

8. A locking device for a foldable stroller as described in claim 1, wherein said second frame further has a guiding ramp at top end thereof.

* * * * *